United States Patent [19]
Kitamura

[11] Patent Number: 4,474,422
[45] Date of Patent: Oct. 2, 1984

[54] OPTICAL SCANNING APPARATUS HAVING AN ARRAY OF LIGHT SOURCES

[75] Inventor: Takashi Kitamura, Yokohama, Japan

[73] Assignee: Canon Kabushiki Kaisha, Tokyo, Japan

[21] Appl. No.: 204,876

[22] Filed: Nov. 7, 1980

[30] Foreign Application Priority Data

Nov. 13, 1979 [JP] Japan .................... 54-146830
Nov. 13, 1979 [JP] Japan .................... 54-146831
Oct. 27, 1980 [JP] Japan .................... 55-150381

[51] Int. Cl.³ ............................. G02B 27/17
[52] U.S. Cl. ...................................... 350/6.8
[58] Field of Search ............... 350/6.8, 6.91; 346/108

[56] References Cited

U.S. PATENT DOCUMENTS 3,750,189  7/1973  Fleischer ................... 346/74
4,253,724  3/1981  Minoura et al. ............. 350/6.8

FOREIGN PATENT DOCUMENTS 7328  1/1979  Japan ....................... 346/108

OTHER PUBLICATIONS

Belleson, "Scanning Method Employing Multiple Flying Spots per Field;" vol. 15, No. 5; 10/1972, pp. 1479-1480.

Primary Examiner—John K. Corbin
Assistant Examiner—Rebecca D. Gass
Attorney, Agent, or Firm—Fitzpatrick, Cella, Harper & Scinto

[57] ABSTRACT

This invention provides an optical scanning apparatus having a compact structure which includes a light-source portion consisting of an array of aligned light sources, a collimating portion for collimating the beams from the light source portion, a deflecting portion for deflecting the collimated beams from the collimating portion, and an imaging portion for causing the deflected beams to form an image on a surface to be scanned, said collimating portions including an exit pupil which is positioned extremely close to the deflecting surface of said deflecting portion.

9 Claims, 26 Drawing Figures

OPTICAL SCANNING APPARATUS HAVING AN ARRAY OF LIGHT SOURCES

BACKGROUND OF THE INVENTION

1 Field of the Invention

This invention relates to an image recording and displaying apparatus which utilizes an array of aligned light sources such as a semiconductor laser array.

2 Description of the Prior Art

Figure 1:
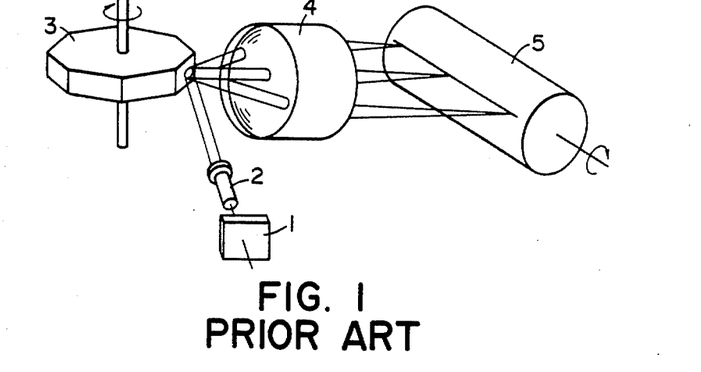
FIG. 1 shows an example of the prior art optical scanning apparatus.

There are known image recording and displaying apparatuses having a single source of light. FIG. 1 shows an example of such apparatuses wherein a divergent beam emitted from a semiconductor laser 1 is collimated by means of a collimator lens 2 and falls on a rotary multifaceted mirror 3. The beam which has been reflected and deflected by the rotary multifaceted mirror is then brought to a focus on a surface 5 to be scanned through an imaging lens 4 such as an f$\theta$ lens or the like. By modulating the semiconductor laser, the desired image can be formed on the surface to be scanned.

Figure 2:
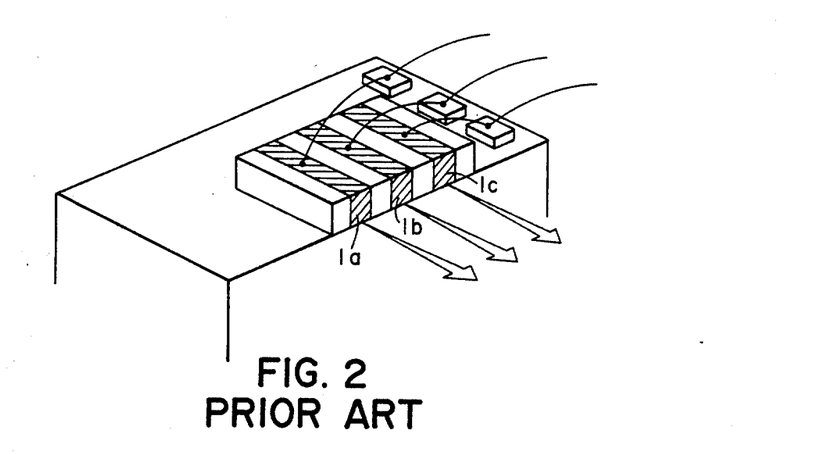
FIG. 2 shows an example of semiconductor laser array.

If an array of aligned light sources are used in such an apparatus, various advantages will be obtained. The term "an array of aligned light sources" is defined herein as such a construction that a plurality of semiconductor lasers 1a, 1b and 1c which can be independently driven and modulated are brought into a line as shown in FIG. 2. If these light sources are used instead of a single light source, one can obtain the following advantages:

1. The apparatus can be run at higher speed because a plurality of scanning lines are utilized for recording and displaying.
2. For this reason, a rotary multifaceted mirror, a galvano mirror and the like can be operated at lower speed.
3. Semiconductor lasers can be used with lower power resulting in prolonged life.

However, if such light sources are used in the prior art optical systems without modifying, there can be provided such disadvantages as described hereinbelow.

Figure 3:
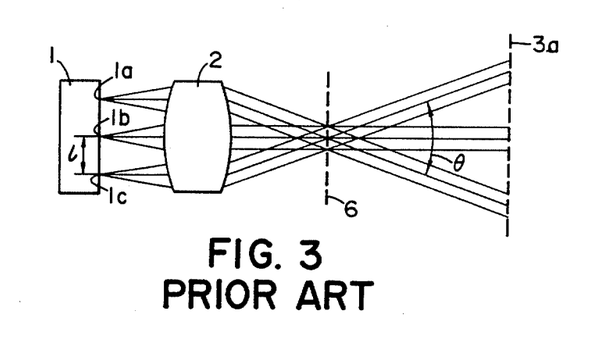
FIGS. 3, 5, and 6 illustrate various disadvantages in the prior art wherein light sources are aligned in an array.

FIG. 3 illustrates an example of an optical system wherein three semiconductor lasers 1a, 1b and 1c are used as a light source portion 1. Beams emitted from the semiconductor lasers 1a, 1b and 1c are oscillated to distribute with maximum intensity in a direction perpendicular to the end face of the light source portion 1. When the beams are collimated by a collimator lens 2, the beam from the semiconductor laser 1b on the optical axis only becomes parallel to the axis while the remaining beams from the semiconductor lasers 1a and 1c located off of the axis are collimated to intersect the optical axis with a finite angle $\theta$. This angle $\theta$ is obtained by the use of the following formula:

$$\theta = n \, 1/f \text{ (rad)}$$

where f is a focal length in the collimator lens, 1 is a pitch in the light source array and n is the number of light sources. It is considered that the pitch 1 in the semiconductor laser array must be about 0.1 mm minimum because of various problems accompanied by heat emanation, manufacturing techniques and the like.

Now, if the focal length f of the collimating lens is 10 mm, and the number of lasers n is 8, the angle $\theta$ is $$8 \times 0.1/10 = 0.08 \text{ rad.} = 4.6°.$$

Further, if the distance d between the focal plane 6 of the collimator lens and the multifaceted mirror is 100 mm, a light spread $\Delta$ on the reflecting surface on the multifaceted mirror is $$\Delta = d \cdot \theta = 100 \times 0.08 = 8 \text{ mm}.$$

Figure 4A:
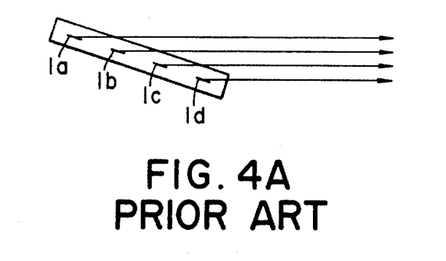
FIGS. 4A and 4B illustrate known light source arrays; parameters considered in devising the present invention where light sources are aligned.
Figure 5:
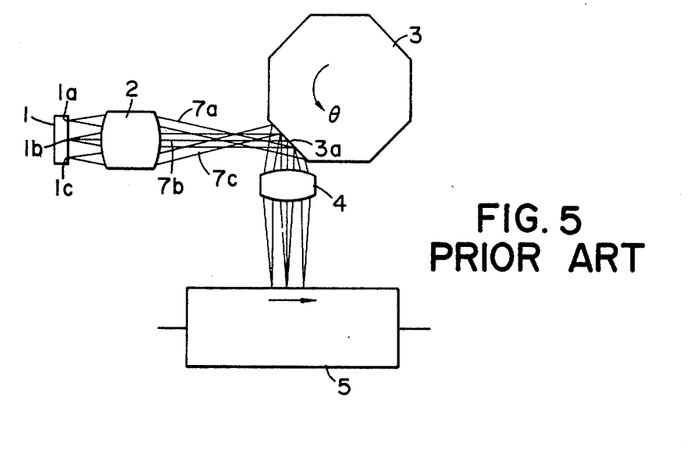
Figure 6:
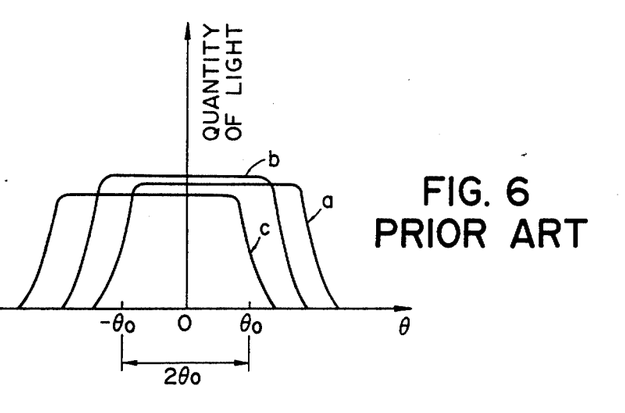

This value cannot be neglected. As a result, if light sources 1a, 1b, 1c and 1d are disposed along such a line that is parallel or substantially parallel to the primary scanning direction as shown in FIG. 4A, light spots would be spread on the reflecting surface 3a of the multifaceted mirror 3 in the rotational direction thereof as shown in FIG. 5. Consequently, each of the beams 7a, 7b and 7c collimated by the lens 2 will have a quantity of reflected light per rotational angle $\theta$ of the multifaceted mirror 3 which is distributed as shown in FIG. 6. As seen from FIG. 6, the range of rotational angle $2\theta_o$ in which the scanning can be effectively made is extremely narrow in comparison with the case of a single source of light.

In order to overcome such a problem, the multifaceted mirror must be increased in diameter. This means that the multifaceted mirror cannot be easily driven or otherwise a motor for driving this mirror should have higher power resulting in increased cost and size.

Figure 4B:
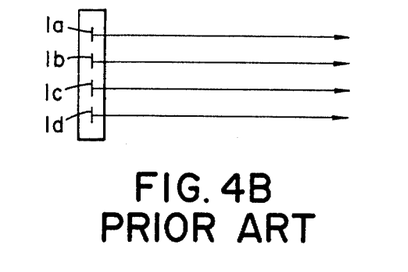

If the light sources 1a, 1b, 1c and 1d are located along such a line that is perpendicular to the primary scanning direction as shown in FIG. 4B, the multifaceted mirror may have the same diameter as in a single light source. However, it must be increased in thickness since the beam spread on the reflecting surface is widened to distribute along the rotational axis of the multifaceted mirror. Similarly, such an arrangement will have the same problems as in the multifaceted mirror having its increased diameter.

SUMMARY OF THE INVENTION

It is an object of this invention to provide an improved optical scanning apparatus having an array of aligned light sources which may include a small-sized deflector and which have a compact structure manufactured inexpensively.

Another object of this invention is to provide an improved optical scanning apparatus of the above type which is adapted to correct any pitch variation of beam on a surface to be scanned due to inclination in the deflecting surface of a deflector or in the rotating shaft thereof.

According to this invention, the above objects can be accomplished by converging a plurality of light beams on an area as small as possible adjacent the deflecting surface of the deflector.

In one aspect of this invention, the optical scanning apparatus comprises an array of aligned semiconductor lasers as an light-source array which is adapted to emit nonparallel rays, a deflector such as a multifaceted mirror, a galvanomirror or the like which includes a polygonal deflecting surface, and a collimator lens for collimating the rays from the light sources, which has an exit pupil at the side of said deflector, the position of said exit pupil or a position conjugate therewith being extremely close to the deflecting surface of said deflector.

In other words, this invention utilizes a concept of a deflective scan plane which can be formed with time by beams deflected at the deflector. Considering ray components of each beam emitted from said light-source portion in the deflective scan plane, the chief ray in these ray components is incident parallel to the optical axis in the collimator lens. The collimator lens has a focal position at the side of the deflector or a conjugate position therewith which is extremely close to the deflecting and reflecting surface of the deflector. Thus, the deflector can be maintained with the same size as in a single light source, even if the number of light sources is increased.

In another aspect of this invention, the collimator lenses can be divided into two groups of lens with one group of negative power being disposed at a position close to the light sources while the other group of positive power being located at another position close to the deflector, if the collimator lens has its small focal length so that the reflecting surface of the deflector cannot be disposed close to the focal position of the collimator lens. Thus, the primary plane of the collimator lens groups at the side of the deflector can be positioned as close as possible to the deflector so that the distance therebetween will be increased.

In still another aspect of this invention, the optical scanning apparatus is able to have a function for correcting any inclination by comprising a light-source portion consisting of an array of aligned light sources, a deflecting portion for simultaneously deflecting the beams from said light-source portion, a scanned surface adapted to be scanned simultaneously by the deflected beams from the deflector, a first anamorphic optics member disposed between said light-source and deflecting portions, and a second anamorphic optics member located between said deflecting portion and said scanned surface. In a plane parallel to said deflective scan plane, the position of the pupil in said first anamorphic optics member at the side of the deflecting portion or a position optically conjugate therewith is close to the polygonal deflecting surface of said deflecting portion. Thus, the deflecting portion may have its deflecting surface of small size. Furthermore, the first anamorphic optics member is adapted to cause the beams from the light-source portion to be incident on the deflecting surface of said deflecting portion substantially under parallel-ray state in the plane parallel to said deflective scan plane and also to cause them to be incident on the deflecting surface under such a state that the beams are imaged thereon in a plane perpendicular to said deflective scan plane. Consequently, each of the beams from the light-source portion is imaged on the deflecting surface along a line in a direction parallel to said deflective scan plane. Each beam imaged in a line is further imaged on the scanned surface through said second anamorphic optics member to form a better spot. The deflecting surface of the deflecting portion is now held at an optically conjugate position with the scanned surface through the second anamorphic optics member in the plane parallel to the deflective scan plane so that the influence due to any inclination in the deflecting portion will be corrected.

If the optical scanning apparatus according to this invention is provided with semiconductor lasers as light sources, it would be preferred that said first anamorphic optics member comprises a collimator lens for collimating the beams from the light-source portion and a cylindrical lens for converging the light components of the parallel beams from the collimator lens which are positioned in a plane perpendicular to the deflective scan plane.

DESCRIPTION OF THE PREFERRED EMBODIMENTS

Figure 7:
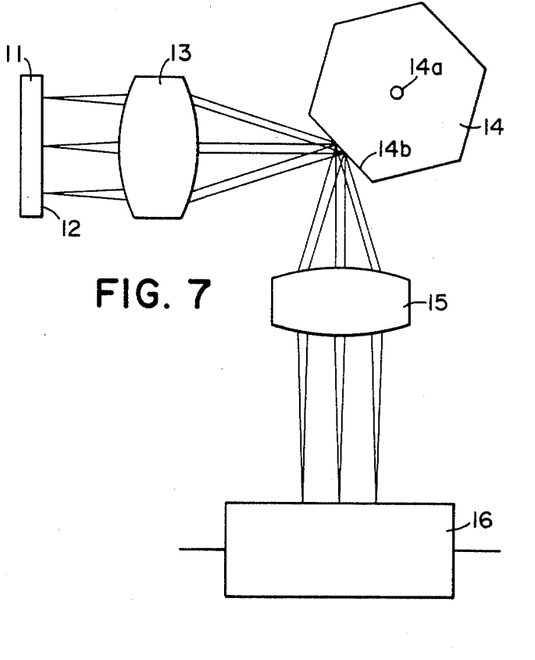
FIG. 7 is a plan view of an optical system which is an embodiment of this invention.
Figure 8:
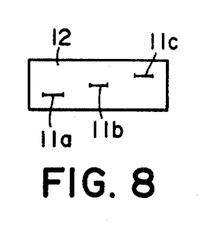
FIG. 8 is a front view of the light-source portion shown in FIG. 7.

FIG. 7 is a plan view showing an embodiment of the optical scanning apparatus according to this invention. The apparatus comprises a light-source portion 11 consisting of a plurality of semiconductor lasers which are aligned in an array. The emitting surface 12 of the light-source portion 11 is disposed in one focal plane of a collimator lens 13. FIG. 8 is a view in which the emitting surface 12 is viewed from the side of the collimator lens 13. It is understood that light-emitting portions 11a, 11b and 11c are in progressively closer in position relative to the rotating shaft 14a of a multifaceted (polygonal) mirror 14. A chief ray in the beam emitted from each light-emitting portion is incident on the collimator lens 13 under such a state that it is parallel to the optical axis in the collimator lens 13. The focal position of the collimator lens 13 at the side of the polygonal mirror 14, which is a position corresponding to an exit pupil of the collimator lens 13 in the illustrated embodiment, is close to the deflecting surface 14b of the polygonal mirror for deflecting the beams. The beams deflected by the polygonal mirror 14 are imaged upon photosensitive surface 16 in a cylindrical photoreceptor through a imaging lens 15.

Figure 9A:
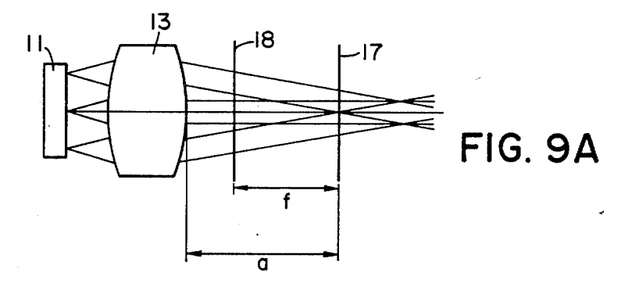
FIGS. 9A and 9B are illustrative views of a collimator lens's structure which can be used in the optical system according to this invention.
Figure 9B:
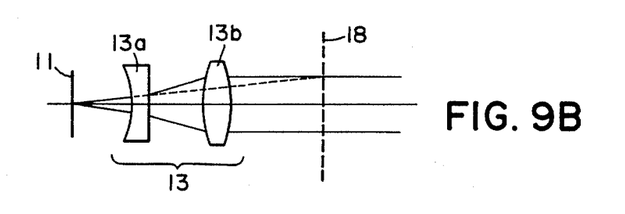

If the reflecting surface 14b of the polygonal mirror 14 cannot be disposed at a position close to the focal position 17 of the collimator lens 13 because the focal length of the collimator lens 13 is too short, such a problem can be overcome by arrangement as shown in FIGS. 9A and 9B. In an arrangement of FIG. 9A, the collimator lens 13 has its primary plane 18 located at a position as close as possible to the deflector so that the focal length f of the collimator lens 13 will be smaller than a distance a between the focal plane 17 of the collimator lens 13 and the end face thereof at the side of the deflector. FIG. 9B shows a structure of the collimator lens 13 for providing the arrangement shown in FIG. 9A. In this structure, the collimator lenses 13 is divided into two groups of lens 13a and 13b with one lens group 13a of negative power being located close to the light-source portion while the other lens group 13b of positive power being disposed close to the deflector. As a result, said primary plane 18 will be shifted toward the deflector so that the distance between the deflector and the collimator lens can be increased. Thus, even if the focal length of the collimator lens 13 is too short, the deflecting surface of the deflector can be disposed nearby the focal plane 17 of the collimator lens 13.

Figure 10A:
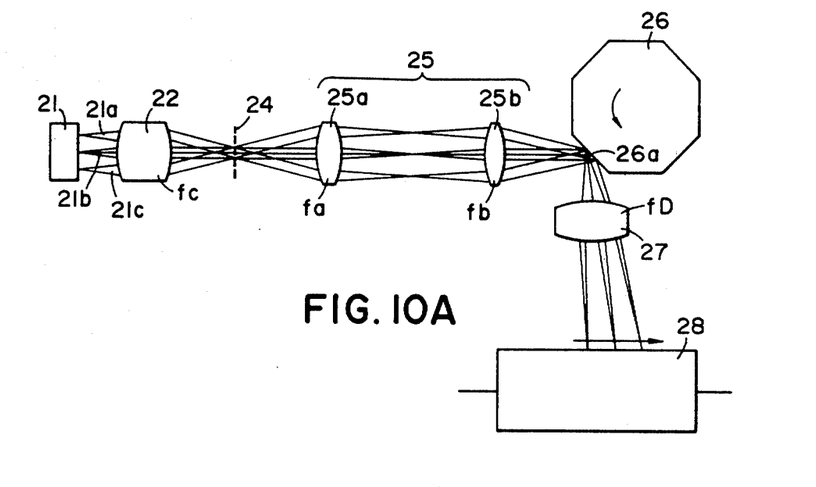
FIGS. 10A and 10B show another embodiment of the optical scanning system according to this invention.
Figure 10B:
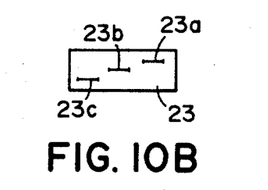

FIG. 10A is a plan view showing another embodiment of the optical scanning apparatus according to this invention, and FIG. 10B is a front view of this embodiment in which the light-emitting face 23 of a light-source portion 21 including semiconductor lasers is viewed from a collimator lens 22. As shown in FIG. 10B, the light-emitting portions 23a, 23b and 23c, which are all semiconductor lasers, are slightly shifted from one another in a vertical direction as viewed along the optical axis of the collimator lens 22. Beams 21a, 21b and 21c emanating from the light-emitting portions are collimated by the collimating lens 22 and then passed through the exit pupil 24 to be incident upon an afocal system 25 which consists of two positive lens elements 25a and 25b. The afocal system 25 is adapted to emanate parallelray beams. With respect to this afocal system 25, the exit pupil 24 of the collimator lens 22 is optically conjugate with the deflecting and reflecting surface 26a of a polygonal mirror 26. As a result, the image of the exit pupil 24 will be formed close to the deflecting and reflecting surface 26a. Thereafter, the beams are deflectively scanned by the polygonal mirror 26 and then imaged through an imaging lens system 27 upon a photoreceptive drum 28 which provides a surface to be scanned. Therefore, the drum surface will be scanned by a plurality of beam spots as the polygonal mirror is rotated. Since the light-emitting portions are positioned at different levels in the vertical direction as shown in FIG. 10B, the beam spots imaged on the drum also are slightly shifted from one another in a direction that is perpendicular to the drawing.

Figure 11:
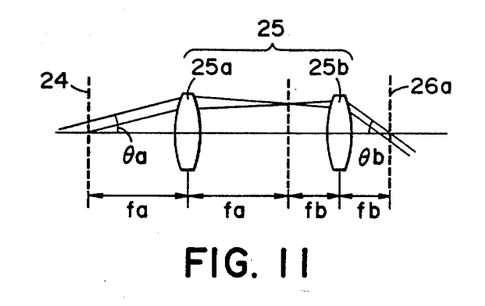
FIG. 11 illustrates an afocal system used in the optical scanning system shown in FIG. 10.

FIG. 11 illustrates a principle in the above afocal system 25 which consists of a positive lens group 25a having a focal length fa and a positive lens group 25b having a focal length fb. The exit pupil 24 of the collimator lens 22 is positioned at the forward focal plane of the positive lens group 25a while the deflecting and reflecting surface 26a of the deflector 26 is located at the rearward focal plane of the positive lens group 25b. The lens groups 25a and 25b are spaced away from each other by the sum (fa + fb) of the focal lengths fa, fb. In such an arrangement, the conjugate plane of the exit pupil 24 of the collimator lens 22 can be formed in the reflecting surface of the deflector 26. This is more advantageous than that in which the deflecting surface 26a of the scanner is directly located in the exit pupil plane 24 of the collimator lens in the following points.

(i) By providing the focal length fb of the rearward lens group 25b which is longer than the focal length fc of the collimator lens 22, a space between the afocal lens system and the deflector can be increased resulting in facility in designing.

(ii) By changing the focal lengths fa, fb of the forward and rearward lens groups 25a, 25b in the afocal lens system 25, an angular magnification $\gamma$ can be optionally changed as shown by the following formula:

$$\gamma = \theta b/\theta a = fa/fb$$

where $\theta a$ is an incident angle into the forward lens group and $\theta b$ is an emanant angle from the rearward lens group. For example, if the angular magnification $\gamma$ is decreased, a distance S between the adjacent imaged spots on the imaging surface is also decreased as represented by the following formula:

$$S = 1/fc \times \gamma \times f\theta = 1/fc \times fa/fb \times f\theta.$$

Therefore, flexibility in design will be increased.

Figure 12:
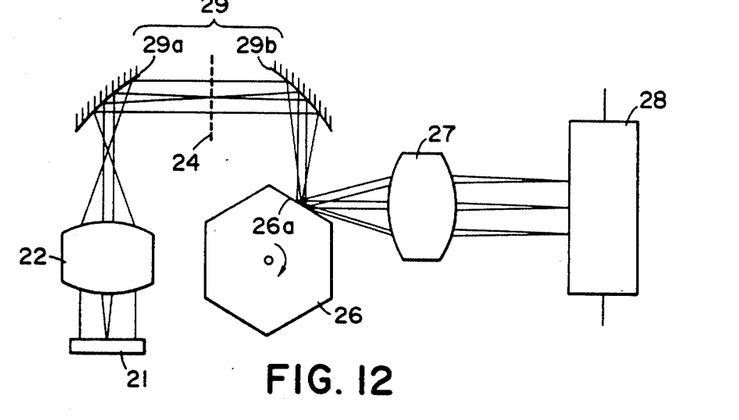
FIG. 12 shows still another embodiment of this invention.

FIG. 12 is a plan view showing still another embodiment of the optical scanning apparatus according to this invention wherein an afocal system 29 comprises two paraboloidal mirrors 29a and 29b. This afocal system has the same function as in the last-mentioned afocal lens system and will not be further described herein.

Figure 13A:
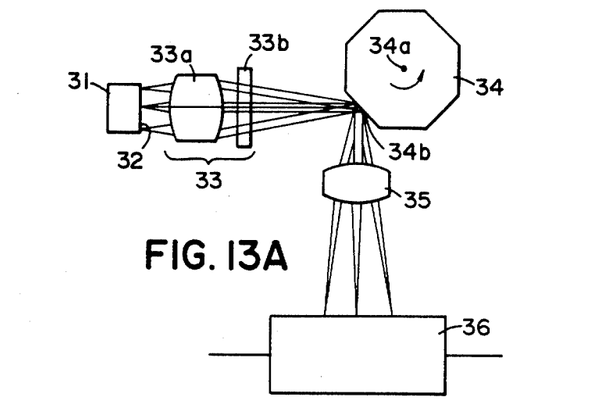
FIGS. 13A and 13B show further embodiment of this invention.
Figure 13B:
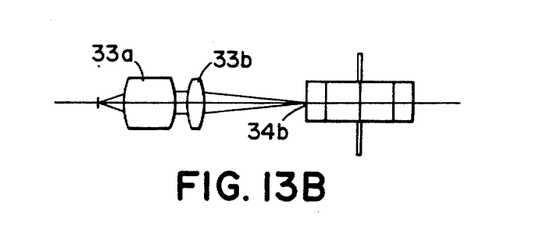

FIGS. 13A and 13B show respectively plan and side views of a further embodiment according to this invention in which the optical scanning apparatus has an inclination-correcting function. In this illustrated embodiment, the optical scanning apparatus includes a light-source portion 31 constructed by an array of aligned semiconductor lasers as a plurality of light sources. The light-emitting face 32 of this light-source portion 31 is disposed in one focal plane of a collimator lens 33a which defines an anamorphic optical system 33. The beams emitted from the semiconductor lasers are collimated by the collimator lens 33a and then passed through a cylindrical lens 33b to be incident on a rotary multifaceted mirror 34. The beams reflected by the rotary multifaceted mirror 34 are imaged on a photoreceptive drum 36 through an imaging lens 35.

In accordance with this invention, the position of a pupil of the collimator lens 33a at the side of the rotary multifaceted mirror or a position optically conjugate with such a pupil is extremely close to the reflecting surface 34b of the rotary multifaceted mirror 34 in a deflective scan plane in which the beams are deflected by the rotary multifaceted mirror, that is, in a plane of FIG. 13A. In other words, the light-source portion is located relative to the collimator lens such that a chief ray of each beam from the respective light-emitting point in the light-source portion is passed through the collimator lens 33a parallel to the optical axis thereof. In addition, the reflecting surface 34b of the rotary multi faceted mirror 34 is extremely close to the focal position of the collimator lens. In such an arrangement, the beam spread on the reflecting surface of the deflector will be the same as in a single light source even if the number of light sources is increased.

As shown in FIG. 13B, the cylindrical lens 33b has its power in a plane perpendicular to the deflective scan plane, which power causes the beams from the lasers to form a linear image on the reflecting surface 34b of the multifaceted mirror 34 in a direction perpendicular to the rotating shaft 34a thereof. This means that irregular pitches in images due to any inclination in the reflecting surface of the rotary multifaceted mirror can be optically corrected as disclosed in U.S. Pat. No. 3,750,189, for example. In other words, the reflecting surface 34b of the rotary multifaceted mirror is positioned close to the focal plane of the collimator lens in the deflective scan plane and at the focal plane of the cylindrical lens 33b in a plane perpendicular to the deflective scan plane.

The imaging lens 35 is similarly an anamorphic system and adapted to cause the parallel-ray beams reflected by the reflecting surface 34b to form images on the photoreceptive drum 36 in the deflective scan plane and also to maintain the reflecting surface 34b in an optically conjugate relationship with the surface of the photoreceptive drum 36 in the plane perpendicular to the deflective scan plane.

As will be apparent from the foregoing, this invention provides an optical scanning apparatus which is provided with a rotary multifaceted mirror of smaller size rotated at higher speed and in which irregular pitches due to any inclination in the reflecting surface of the rotary multifacted mirror can be positively corrected. In the actual application, however, there is a problem in an arrangement when it is desired that the focal length fa' of the cylindrical lens 33b is longer than the focal length fc of the collimator lens. This invention also settles such a problem.

Figure 14A:
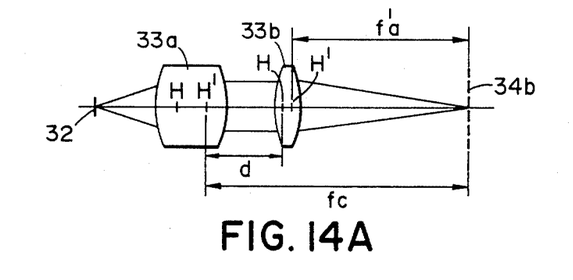
FIGS. 14A, 14B and 15A, 15B show a positional relationship between a collimator lens and a cylindrical lens in the optical scanning system shown in FIG. 13.
Figure 14B:
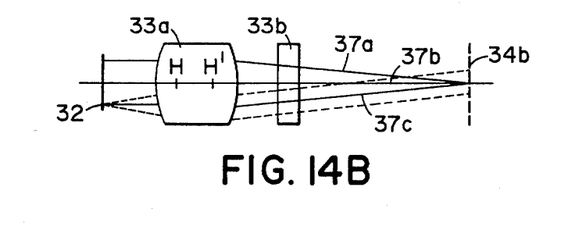

FIGS. 14A, 14B, 15A and 15B illustrate some solutions to the above problem. FIGS. 14A and 14B show a solution when the focal length fa' of the cylindrical lens is shorter than the focal length fc of the collimator lens. In this solution, the cylindrical lens 33b is disposed between the collimator lens 33a and the deflecting surface 34b of the rotary multifaceted mirror 34 so that the focal plane of the collimator lens will substantially coincide with that of the cylindrical lens 33b. FIG. 14B illustrates optical paths in the deflective scan plane which are represented only by chief rays 37a, 37b and 37c from the respective light-emitting portions.

Figure 15A:
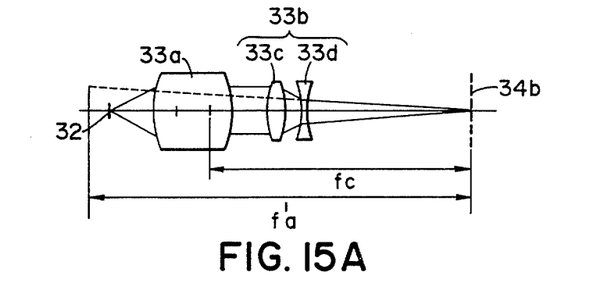
Figure 15B:
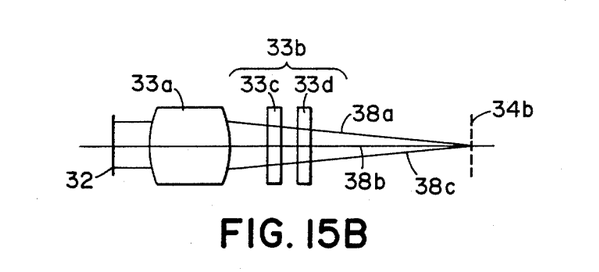

On the other hand, when it is desired that the focal length fa' of the cylindrical lens be longer than that of the collimator lens, the cylindrical lens 33b is divided into a convex lens 33c and a concave lens 33d as shown in FIG. 15A. In such an arrangement, the primary plane of the cylindrical lens can be located at the side of the light-source portion so that the cylindrical lens 33b will be disposed between the collimator lens 33a and the rotary multifaceted mirror 34 as shown in FIG. 15A. FIG. 15B illustrates optical paths in the deflective scan plane which are represented merely by chief rays 38a, 38b and 38c.

Figure 16A:
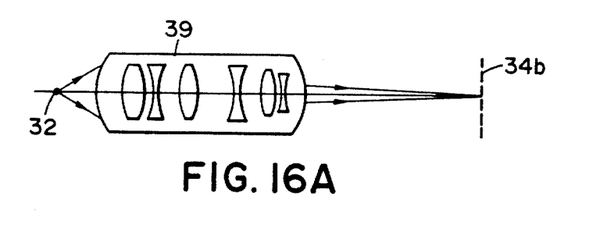
FIGS. 16A and 16B show a positional relationship in optics between a light-source portion and a deflecting portion in the optical scanning system shown in FIG. 13.
Figure 16B:
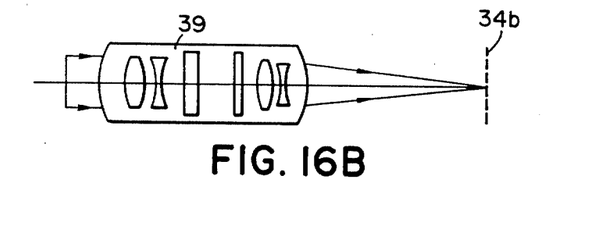

Developing these solutions, the following matters can be said with respect to FIGS. 16A and 16B.

(1) Considering a condensing lens 39 formed integrally by the collimator and cylindrical lenses, the light-emitting point 32 of the semiconductor laser and the reflecting surface 34b of the rotary multifaceted mirror are conjugate with respect to such a direction as is perpendicular to the deflective scan plane as shown in FIG. 16A.

(2) An infinite object point and the reflecting surface 34b of the rotary multifaceted mirror are conjugate in a plane perpendicular to the last-mentioned direction as shown in FIG. 16B.

If a condensing lens is designed to satisfy the above two functions, it can be used at the incident side as an optical system for correcting irregularities due to any inclination in the deflecting surface when a plurality of lasers are used. It will be thus unnecessary to collimate the beams from the lens 33a. As a result, the lenses can be freely designed. Furthermore, a focus can be adjusted by defocusing the overall condensing lens.

Figure 17A:
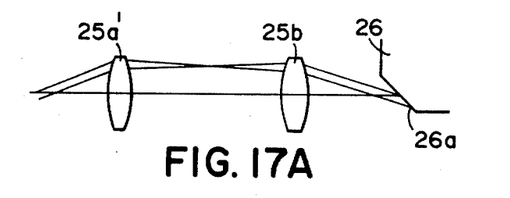
FIGS. 17A and 17B show the optical scanning system of FIG. 10 wherein the afocal optical system thereof has a function for correcting any inclination.
Figure 17B:
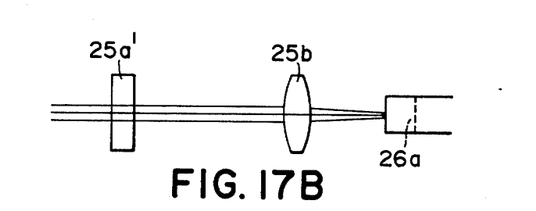

FIG. 17 shows an example of said afocal system 25 where it is given a function for correcting irregularities due to any inclination in the system shown in FIG. 10. FIG. 17A illustrates optical paths in the deflective scan plane while FIG. 17B represents optical paths in a plane perpendicular to the deflective scan plane. As shown in FIGS. 17A and 17B, components of scanning beams in a direction of optical axis, that is, in a direction perpendicular to the deflective scanning direction are imaged on the deflecting and reflecting surface 26a of the deflector 26 in a linear configuration. In order to accomplish this, the positive lens 25a shown in FIG. 10A is replaced by a cylindrical lens 25a' the generating line of which is perpendicular to the rotational axis of the deflector, that is, the deflective scan plane. In the deflective scan plane shown in FIG. 17A, the beams are imaged as in the case of FIG. 10A. In a plane perpendicular to the deflecting surface, on the other hand, the beams from the collimator lens are not imaged by the cylindrical positive lens 25a' but condensed by the positive lens 25b to form a linear image on the deflecting surface 26a. In such an afocal system, an imaging lens system 27 is anamorphic in that the linear image on the deflecting and reflecting surface 26a is maintained optically conjugate with the photoreceptive drum 28 in a plane perpendicular to the deflective scan plane. Accordingly, the beams will not be adversely affected by any inclination in the deflecting and reflecting surface in the plane perpendicular to the deflective scan plane. In the deflective scan plane of the imaging lens system 27, on the other hand, the beams which are deflected by the deflecting and reflecting surface 26a are imaged on the photoreceptive drum 28 as shown in FIG. 10A. In this connection, the paraboloidal mirror 29a can be replaced by a paraboloidal mirror of cylindrical configuration so that the above correction with respect to any inclination will be made.

Figure 18:
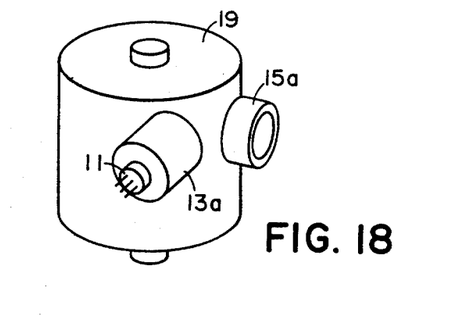
FIG. 18 is a view showing an optical scanning apparatus of this invention which is integrally formed.

FIG. 18 is a perspective view showing an integral unit into which the optical system shown in FIG. 7 is assembled. In such an integral unit, the deflector is mounted in a casing 19 on which housings 13a and 15a for the collimator lens 13 and imaging lens system 15 are mounted. The semiconductor laser array 11 is mounted on the housing 13a of the collimator lens. This integral unit can be more accurately assembled in such a manner that the relative positional relationship between the optical elements will not be disturbed by any external cause such as vibration or the like.

What I claim is

1. An optical scanning apparatus comprising:
    a light-source portion including a plurality of light sources which are arranged in an array, each of said plurality of light sources producing a beam of light;
    a collimating portion, having an exit pupil, for collimating the beams of light produced by said light-source portion as aforesaid, said collimating portion having its optical axis disposed substantially parallel to the principal rays of the beams of light produced by said light-source portion;

a deflector having a deflecting surface for simultaneously scanning the plurality of beams of light collimated by said collimating portion as aforesaid, said deflector being disposed such that said deflecting surface is substantially coincident with the exit pupil of said collimating portion, whereat the principal rays of the beams of light, scanned by said deflector as aforesaid, intersect each other; and an optical imaging system for causing the beams scanned by said deflector as aforesaid to image on a surface to be scanned.

2. The optical scanning apparatus as defined in claim 1 wherein said collimating portion comprises a lens of negative power disposed at the side of said light-source portion, and another lens of positive power located at the side of said deflector.

3. An optical scanning apparatus comprising:
a light-source portion having a plurality of light sources which are arranged in an array, each of said light sources producing a beam of light;
a collimating portion, having an exit pupil, for collimating the beams of light produced by said light-source portion as aforesaid, said collimating portion having its optical axis disposed substantially parallel to the principal rays of the beams of light produced by said light-source portion;
a deflector having a deflecting surface for scanning the beams of light collimated by said collimating portion as aforesaid;
an optical imaging system for causing the beams of light scanned by said deflector as aforesaid to image on a surface to be scanned; and
an afocal optical system disposed between said collimating portion and said deflector for maintaining the exit pupil of said collimating portion optically conjugate with the deflecting surface of said deflector.

4. An optical scanning apparatus comprising a light-source portion having a plurality of aligned semiconductor lasers each for producing a laser beam, a collimator lens for collimating the beams from said semiconductor lasers, said collimator lens having its optical axis positioned parallel to the chief rays of the beams from said semiconductor lasers, a deflector having a deflecting surface which is positioned at the focal plane of said collimator lens, and an optical imaging system for causing the plurality of beams deflected by said deflector to image on a surface to be scanned.

5. The optical scanning apparatus as defined in claim 4 wherein said collimator lens is such that the negative power thereof is provided at the side of said light-source portion while the positive power thereof is provided at the side of said deflector.

6. An optical scanning system comprising:
a light-source portion having a plurality of light sources which are arranged in an array, each of said light sources producing a beam of light;
a deflector having a deflecting surface for deflecting the beams of light produced by said light-source portion as aforesaid in a predetermined direction, simultaneously toward a surface and
an anamorphic optical member, having an exit pupil, disposed between said light-source portion and said deflector, said anamorphic optical member having its optical axis disposed substantially parallel to the principal rays of the beams produced by said light-source portion, wherein said anamorphic optical member causes the beams produced by said light-source portion as aforesaid to fall on said deflecting surface of said deflector with the rays of each beam in parallel in a plane parallel to a deflection scan plane in which said deflecting surface scans the beams of light and wherein said anamorphic optical member also causes the beams of light produced by said light-source portion as aforesaid to image on said deflecting surface in a plane perpendicular to the deflection scan plane, the exit pupil of said anamorphic optical member in the deflection scan plane being located on said deflecting surface of said deflector.

7. The optical scanning apparatus as defined in claim 6 wherein said light-source portion is a semiconductor laser array, and said anamorphic optical member comprises a collimator lens for collimating the beams of light from said semiconductor laser array and a cylindrical lens having a generating line which is parallel to said deflective scan plane.

8. An optical scanning apparatus comprising:
a light-source portion including a plurality of light sources which are arranged in an array, each of said plurality of light sources producing a beam of light;
a collimating portion, having an exit pupil, for collimating the beams of light produced by said light-source portion as aforesaid, said collimating portion having its optical axis disposed substantially parallel to the principal rays of the beams of light produced by said light-source portion;
a deflector having a deflecting surface for simultaneously scanning the plurality of beams of light collimated by said collimating portion as aforesaid, means for rendering said deflecting surface of said deflector substantially optically conjugate with the exit pupil of said collimating portion, whereat the principal rays of the beams of light, scanned by said deflector as aforesaid, intersect each other; and
an optical imaging system for causing the beams scanned by said deflector as aforesaid to image on a surface to be scanned.

9. The optical scanning apparatus as defined in claim 8 wherein said collimating portion comprises a lens of negative power disposed at the side of said light-source portion, and another lens of positive power located at the side of said deflector.

* * * * *

UNITED STATES PATENT AND TRADEMARK OFFICE
CERTIFICATE OF CORRECTION

PATENT NO. : 4,474,422
DATED : October 2, 1984
INVENTOR(S) : TAKASHI KITAMURA

It is certified that error appears in the above-identified patent and that said Letters Patent is hereby corrected as shown below:

IN THE ABSTRACT, line 9, change "portions" to --portion--.

Col. 1, line 61, "$\theta = n\ 1/f(rad)$" should read --$\theta = \frac{n\ 1}{f}(rad)$--.

Col. 2, line 61, change "an" to --a--.

Col. 3, line 15, change "lens" to --lenses--.

Col. 4, lines 14-15, delete "parameters considered in devising the present invention where light sources are aligned;";

line 55, delete "in" (first occurrence);

line 67, change "a" (second occurrence) to --an--.

Col. 5, line 10, change "a" (second occurrence) to --$\underline{a}$--;

line 15, change "lens" to --lenses--;

line 24, change "nearby" to --close to--;

line 58, change "fa" to --$\underline{fa}$--;

line 59, change "fb" to --$\underline{fb}$--;

line 65, change "(fa + fb)" to --($\underline{fa}$ + $\underline{fb}$)--; and       change "fa, fb" to --$\underline{fa}$, $\underline{fb}$--.

UNITED STATES PATENT AND TRADEMARK OFFICE
CERTIFICATE OF CORRECTION

PATENT NO. : 4,474,422

DATED : October 2, 1984

INVENTOR(S) : TAKASHI KITAMURA

It is certified that error appears in the above-identified patent and that said Letters Patent is hereby corrected as shown below:

Col. 6, line 4, change "fb" to --$\underline{fb}$--;

line 6, change "fc" to --$\underline{fc}$--;

line 9, change "fa, fb" to --$\underline{fa}$, $\underline{fb}$--;

line 19, change "S" to --$\underline{S}$--.

Col. 7, line 29, change "fa' " to --$\underline{fa}$'--;

line 30, change "fc" to --$\underline{fc}$--;

line 34, change "fa' " to --$\underline{fa}$'--;

line 35, change "fc" to --$\underline{fc}$--;

line 45, change "fa' " to --$\underline{fa}$'--.

Col. 10, line 45, begin a new paragraph with the word "means".

Signed and Sealed this

Twentieth Day of August 1985

[SEAL]

Attest:

DONALD J. QUIGG

Attesting Officer     Acting Commissioner of Patents and Trademarks